United States Patent [19]

Tintera

[11] Patent Number: 5,745,808
[45] Date of Patent: Apr. 28, 1998

[54] CAMERA EXPOSURE CONTROL SYSTEM USING VARIABLE-LENGTH EXPOSURE TABLES

[75] Inventor: Anthony L. Tintera, Rochester, N.Y.

[73] Assignee: Eastman Kodak Company, Rochester, N.Y.

[21] Appl. No.: 565,371

[22] Filed: Nov. 30, 1995

Related U.S. Application Data

[60] Provisional application No. 60/002,572 Aug. 21, 1995.

[51] Int. Cl.[6] .................................................. G03B 7/097
[52] U.S. Cl. ........................................................ 396/236
[58] Field of Search ............................. 396/236; 348/229, 348/230, 362–366, 64

[56] References Cited

U.S. PATENT DOCUMENTS

| | | | |
|---|---|---|---|
| 4,884,144 | 11/1989 | Jinnai et al. | 358/228 |
| 4,903,136 | 2/1990 | Iketani | 358/228 |
| 4,953,029 | 8/1990 | Morimoto et al. | 364/64 |
| 4,969,045 | 11/1990 | Haruki et al. | 358/228 |
| 5,017,955 | 5/1991 | Kotani | 396/236 |
| 5,079,622 | 1/1992 | Toshinobu | 358/32 |
| 5,115,319 | 5/1992 | Arai et al. | 358/228 |
| 5,258,848 | 11/1993 | Kondo et al. | 358/228 |
| 5,315,394 | 5/1994 | Kurashige et al. | 348/229 |
| 5,606,392 | 2/1997 | Tintera et al. | 396/236 X |

Primary Examiner—W. B. Perkey
Attorney, Agent, or Firm—David M. Woods

[57] ABSTRACT

A photographic camera includes a photosensitive image receiver for generating an image, an optical system for focusing incident light representative of the image upon the receiver, and an exposure control section for generating an exposure value from the incident light that is used to regulate image capture. The exposure control section includes an exposure table containing control values that regulate the acquisition parameters that control the image. The table includes a sequence of table entries for exposure values and corresponding values of at least one of an optical aperture value and an electronic gain value that provide for each table entry a correct exposure for the corresponding exposure value. The sequence of table entries are selected to include the switch points for aperture and gain such that increments between exposure values are variable in length, while a continuous series of optical aperture values and gain values are represented in the table. By thus using variable-length exposure value increments, the tables can be tailored to provide optimum image quality while minimizing the size of memory needed to store the tables.

17 Claims, 10 Drawing Sheets

'AUTO' MODE EXPOSURE PROGRAM USING VARIABLE-LENGTH EXPOSURE TABLE

| EV (IN 1/100 EV) | EXPOSURE TIME (STEPS)* | APERTURE STEP | GAIN STEP |
|---|---|---|---|
| 1248 | 358 | 5 | 0 |
| 1179 | 357 | 4 | 0 |
| 1147 | 356 | 4 | 1 |
| 1120 | 358 | 4 | 2 |
| 1098 | 357 | 4 | 3 |
| 1079 | 357 | 4 | 4 |
| 1062 | 357 | 4 | 5 |
| 1047 | 356 | 4 | 6 |
| 984 | 460 | 4 | 7 |
| 965 | 357 | 3 | 7 |
| 922 | 356 | 2 | 7 |
| 890 | 358 | 1 | 7 |
| 882 | 356 | 0 | 7 |
| 859 | 358 | 0 | 7 |
| 800 | 460 | 0 | 8 |

*CALCULATED DURING RUNTIME

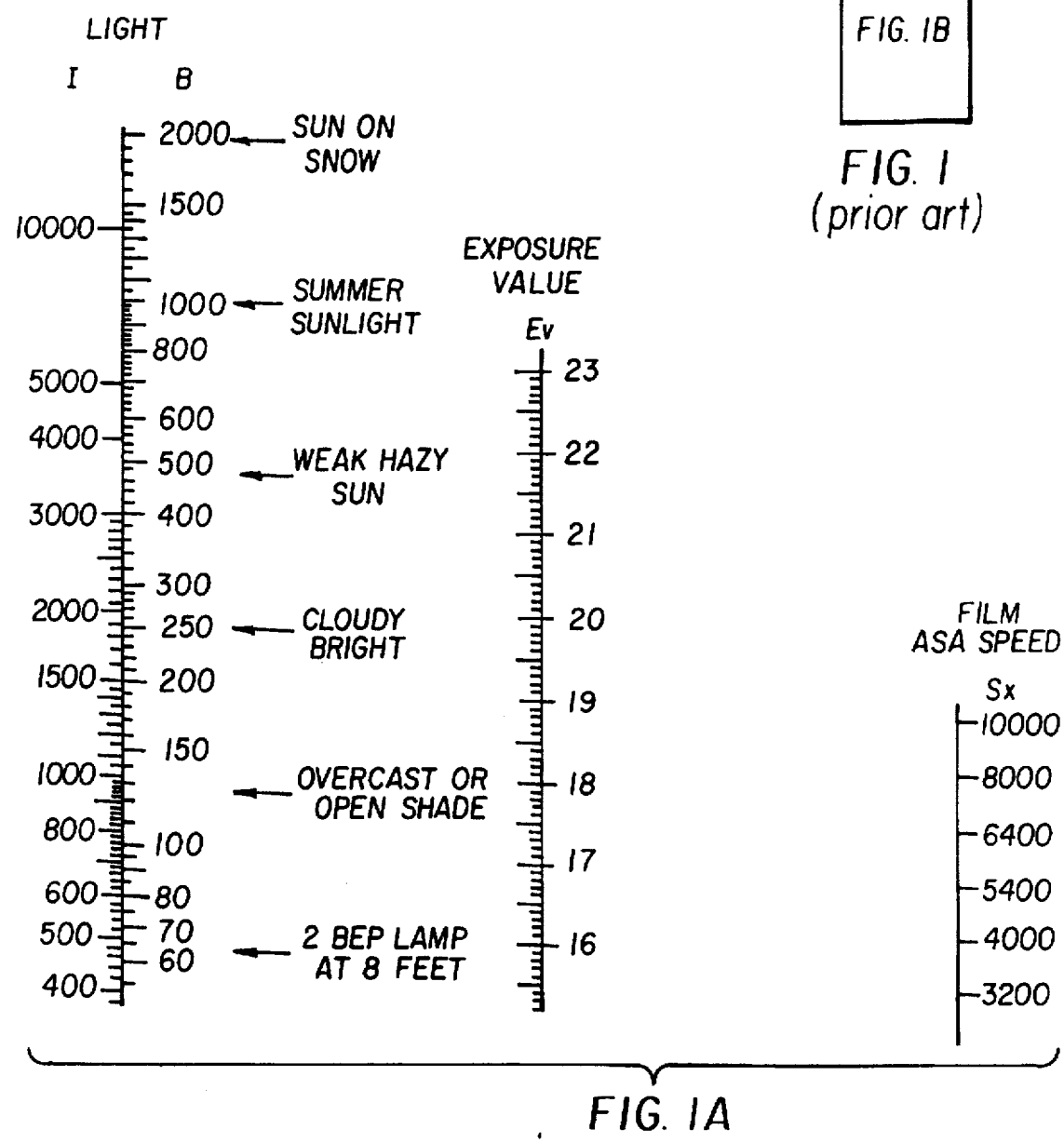

| 'AUTO' MODE EXPOSURE PROGRAM USING QUANTIZED EXPOSURE TABLE ||||
| --- | --- | --- | --- |
| EV (IN 1/100 EV)* | EXPOSURE TIME (STEPS)** | APERTURE STEP | GAIN STEP |
| 1500 | 62 | 5 | 0 |
| 1450 | 88 | 5 | 0 |
| 1400 | 125 | 5 | 0 |
| 1350 | 176 | 5 | 0 |
| 1300 | 250 | 5 | 0 |
| 1250 | 353 | 5 | 0 |
| 1200 | 308 | 4 | 0 |
| 1150 | 349 | 4 | 1 |
| 1100 | 352 | 4 | 3 |
| 1050 | 349 | 4 | 6 |
| 1000 | 411 | 4 | 7 |
| 950 | 293 | 2 | 7 |
| 900 | 334 | 1 | 7 |
| 850 | 333 | 0 | 9 |
| 800 | 460 | 0 | 9 |
| 750 | 460 | 0 | 9 |
| 700 | 460 | 0 | 9 |

*IMPLIED BY FIXED TABLE POSITION
**CALCULATED DURING RUNTIME

FIG. 2A
(Prior Art)

| 'SPORTS' MODE EXPOSURE PROGRAM USING QUANTIZED EXPOSURE TABLE | | | |
|---|---|---|---|
| EV (IN 1/100 EV)* | EXPOSURE TIME (STEPS)** | APERTURE STEP | GAIN STEP |
| 1500 | 62 | 5 | 0 |
| 1450 | 88 | 5 | 0 |
| 1400 | 125 | 5 | 0 |
| 1350 | 109 | 4 | 0 |
| 1300 | 105 | 3 | 0 |
| 1250 | 110 | 2 | 0 |
| 1200 | 125 | 1 | 0 |
| 1150 | 133 | 0 | 1 |
| 1100 | 134 | 0 | 3 |
| 1050 | 133 | 0 | 6 |
| 1000 | 134 | 0 | 8 |
| 950 | 133 | 0 | 10 |
| 900 | 118 | 0 | 12 |
| 850 | 146 | 0 | 12 |
| 800 | 146 | 0 | 12 |
| 750 | 146 | 0 | 12 |
| 700 | 146 | 0 | 12 |

*IMPLIED BY FIXED TABLE POSITION
**CALCULATED DURING RUNTIME

FIG. 2B
(Prior Art)

| 'AUTO' MODE EXPOSURE PROGRAM USING VARIABLE-LENGTH EXPOSURE TABLE | | | |
|---|---|---|---|
| EV (IN 1/100 EV) | EXPOSURE TIME (STEPS)* | APERTURE STEP | GAIN STEP |
| 1248 | 358 | 5 | 0 |
| 1179 | 357 | 4 | 0 |
| 1147 | 356 | 4 | 1 |
| 1120 | 358 | 4 | 2 |
| 1098 | 357 | 4 | 3 |
| 1079 | 357 | 4 | 4 |
| 1062 | 357 | 4 | 5 |
| 1047 | 356 | 4 | 6 |
| 984 | 460 | 4 | 7 |
| 965 | 357 | 3 | 7 |
| 922 | 356 | 2 | 7 |
| 890 | 358 | 1 | 7 |
| 882 | 356 | 0 | 7 |
| 859 | 358 | 0 | 7 |
| 800 | 460 | 0 | 8 |

*CALCULATED DURING RUNTIME

FIG. 3A

| 'SPORTS' MODE EXPOSURE PROGRAM USING VARIABLE-LENGTH EXPOSURE TABLE ||||
|---|---|---|---|
| EV (IN 1/100 EV) | EXPOSURE TIME (STEPS)* | APERTURE STEP | GAIN STEP |
| 1390 | 134 | 5 | 0 |
| 1320 | 134 | 4 | 0 |
| 1264 | 134 | 3 | 0 |
| 1221 | 134 | 2 | 0 |
| 1190 | 134 | 1 | 0 |
| 1169 | 146 | 0 | 0 |
| 1149 | 134 | 0 | 1 |
| 1123 | 134 | 0 | 2 |
| 1100 | 134 | 0 | 3 |
| 1081 | 134 | 0 | 4 |
| 1064 | 134 | 0 | 5 |
| 1049 | 134 | 0 | 6 |
| 1023 | 134 | 0 | 7 |
| 1000 | 134 | 0 | 8 |
| 981 | 134 | 0 | 9 |
| 949 | 134 | 0 | 10 |
| 923 | 134 | 0 | 11 |
| 400 | 134 | 0 | 12 |

*CALCULATED DURING RUNTIME

FIG. 3B

| FIG.4A | FIG.4B |

FIXED LENGTH EXPOSURE TABLE

| EV (IMPLIED) | EXP.TIME STEPS | APERTURE STEP | GAIN STEP | FLASH CHARGE | FLASH DISCHARGE |
|---|---|---|---|---|---|
| 20.00 | 4 | 12 | 0 | 255 | 0 |
| 19.50 | 6 | 12 | 0 | 255 | 0 |
| 19.00 | 9 | 12 | 0 | 255 | 0 |
| 18.50 | 13 | 12 | 0 | 255 | 0 |
| 18.00 | 18 | 12 | 0 | 255 | 0 |
| 17.50 | 26 | 12 | 0 | 255 | 0 |
| 17.00 | 36 | 12 | 0 | 255 | 0 |
| 16.50 | 52 | 12 | 0 | 255 | 0 |
| 16.00 | 73 | 12 | 0 | 255 | 0 |
| 15.50 | 104 | 12 | 0 | 255 | 0 |
| 15.00 | 147 | 12 | 0 | 255 | 0 |
| 14.50 | 208 | 12 | 0 | 255 | 0 |
| 14.00 | 294 | 12 | 0 | 255 | 0 |
| 13.50 | 159 | 11 | 0 | 255 | 0 |
| 13.00 | 225 | 11 | 0 | 255 | 0 |
| 12.50 | 156 | 10 | 0 | 255 | 0 |
| 12.00 | 221 | 10 | 0 | 255 | 0 |
| 11.50 | 233 | 9 | 0 | 255 | 0 |
| 11.00 | 330 | 9 | 0 | 255 | 0 |
| 10.50 | 396 | 8 | 0 | 255 | 53 |
| 10.00 | 417 | 7 | 0 | 255 | 105 |
| 9.50 | 373 | 7 | 2 | 255 | 18 |
| 9.00 | 328 | 7 | 3 | 255 | 0 |
| 8.50 | 313 | 7 | 4 | 255 | 0 |
| 8.00 | 417 | 6 | 4 | 255 | 0 |
| 7.50 | 480 | 4 | 4 | 255 | 60 |
| 7.00 | 504 | 2 | 4 | 255 | 110 |
| 6.50 | 567 | 0 | 4 | 255 | 140 |
| 6.00 | 573 | 0 | 4 | 255 | 140 |
| 5.50 | 573 | 0 | 4 | 255 | 140 |
| 5.00 | 573 | 0 | 4 | 255 | 140 |
| 4.50 | 573 | 0 | 4 | 255 | 140 |
| 4.00 | 573 | 0 | 4 | 255 | 140 |
| 3.50 | 573 | 0 | 4 | 255 | 140 |
| 3.00 | 573 | 0 | 4 | 255 | 140 |
| 2.50 | 573 | 0 | 4 | 255 | 140 |
| 2.00 | 573 | 0 | 4 | 255 | 140 |
| 1.50 | 573 | 0 | 4 | 255 | 140 |
| 1.00 | 573 | 0 | 4 | 255 | 140 |
| 0.50 | 573 | 0 | 4 | 255 | 140 |
| 0.00 | 573 | 0 | 4 | 255 | 140 |

FIG. 5 (Prior Art)

VARIABLE-LENGTH EXPOSURE TABLE

| EV (STORED) | EXP.TIME STEPS | APERTURE STEP | GAIN STEP | FLASH CHARGE | FLASH DISCHARGE |
|---|---|---|---|---|---|
| 20.00 | 4 | 12 | 0 | 255 | 0 |
| 13.90 | 120 | 11 | 0 | 255 | 0 |
| 12.50 | 156 | 10 | 0 | 255 | 0 |
| 11.50 | 233 | 9 | 0 | 255 | 0 |
| 10.80 | 321 | 8 | 0 | 255 | 53 |
| 10.30 | 338 | 7 | 0 | 255 | 105 |
| 9.90 | 353 | 7 | 1 | 255 | 66 |
| 9.50 | 373 | 7 | 2 | 255 | 18 |
| 9.20 | 285 | 7 | 3 | 255 | 0 |
| 8.90 | 237 | 7 | 4 | 255 | 0 |
| 8.20 | 364 | 6 | 4 | 255 | 0 |
| 7.80 | 470 | 5 | 4 | 255 | 20 |
| 7.50 | 480 | 4 | 4 | 255 | 60 |
| 7.20 | 505 | 3 | 4 | 255 | 88 |
| 7.00 | 504 | 2 | 4 | 255 | 110 |
| 6.80 | 512 | 1 | 4 | 255 | 127 |
| 6.60 | 529 | 0 | 4 | 255 | 140 |
| 0.00 | 573 | 0 | 4 | 255 | 140 |

FIG. 6

CAMERA EXPOSURE CONTROL SYSTEM USING VARIABLE-LENGTH EXPOSURE TABLES

CROSS REFERENCE TO RELATED APPLICATION

Reference is made to and priority claimed from U.S. provisional application Ser. No. 60/002,572, filed Aug. 21, 1995, entitled A CAMERA ESPOSURE CONTROL SYSTEM USING VARIABLE-LENGTH ESPOSURE TABLES.

FIELD OF THE INVENTION

The invention relates generally to the field of photography, and in particular to the implementation of exposure control in a photographic system..

BACKGROUND OF THE INVENTION

Both electronic and film cameras ordinarily vary image acquisition parameters to properly expose an image receiver, such as a film or an electronic image sensor, for a wide range of scene illumination levels. For instance, such cameras decide proper settings for an exposure time and an aperture in order to expose the film or the image sensor effectively. In addition, an electronic camera may need to set the output gain applied to the sensor. These parameters frequently exist as values in a table stored in an electronic memory, particularly if there are many values which these parameters can take. In systems which use such exposure tables, the ambient light of the scene is measured by a sensor (either a dedicated exposure sensor or, for an electronic camera, sometimes the image sensor itself). The resulting digital value or voltage (the digitized output of the exposure sensor module) is converted to an evaluated exposure value that is then used to dereference the exposure table to determine the settings which properly expose the image sensor or the film for the measured scene light level.

To understand the use of the term exposure value (EV), refer to the table in FIG. 1. The footlamberts column for the light range is exemplary of a range of real-life light levels. It is possible to find the exposure value for any of these light levels for a given receiver speed (ISO) by drawing a line between the operating ISO and the light level. The intersection of this line with the middle column specifies the exposure value for the measured light level and operating ISO. This will represent the scene light level in a relative log space, which is the space in which exposure tables are stored. It is clear that the normal light range generally falls in the range of 0–20 EV, or approximately 20 stops of exposure range. Cameras often use only a subset of this range, as determined by the sensitivity of the system, which will determine the lowest light level which can be exposed properly. The highest light levels are also often too bright to create a proper exposure, given the available exposure parameter range.

An exposure control algorithm uses the evaluated exposure value for the measured light level and the proper exposure table to determine the appropriate exposure time, gain, and aperture settings from the table. Interpolation for exposure values between table entries is accomplished by on-the-fly calculation of exposure time. In other words, the other acquisition parameters (aperture and gain) remain unchanged, while the exposure time is adjusted for the proper exposure. In generating the table, the acceptable exposure time range is used to decide on the values in the table, so that interpolation yields the correct capture settings. A table-based exposure control system is described in U.S. Pat. No. 5,258,848, in which data on the quantity of incident light is given to a table and then the table outputs a iris gain setting value, a shutter gain setting value, and an automatic gain control (AGC) gain setting value corresponding to the light value.

In a known, quantized (fixed-length) exposure table, such as shown in FIGS. 2A and 23 B for an "auto" mode and a "sports" mode, the exposure value does not have to appear (i.e., it is implied directly from the location of elements in the table). Instead, when the table is generated each quantization step is made to correspond to a particular exposure value increment and the other values (aperture, gain, etc.) are forced to match that increment. That is, the exposure value is the independent variable and the other values are generated by an optimization routine, based on the exposure value. (The exposure time is ordinarily not stored, but calculated at runtime). By forcing the exposure values into discrete increments, this often results in the aperture or gain steps skipping possible actual levels that can be achieved with the aperture or gain control adjustment. For example, in FIG. 2A gain steps of 2, 4, 5, 8 and an aperture step of 3 are missing. The overall effect of this can be to decrease the quality of the captured image, because the aperture or gain steps chosen for a given light level from the fixed-length exposure table are not optimal.

Different exposure tables can be designed for different camera operating modes that are used to optimally capture different scene types. Portrait mode could be used for correctly capturing stationary persons, who will comprise most of the image. Sports mode could be used to correctly expose subjects which are moving. Landscape mode can be used to capture images where the subject is far away. Auto mode can be used in a conservative approach to capture most subjects. Each of these modes can utilize specific exposure tables to optimize the final capture parameters most critical to that type of subject. For example, portrait mode will attempt to use large aperture diameters to create a shallow depth--of-field, which will blur the background and produce a desired effect in the final capture, and the sports mode will emphasize a fast shutter speed (exposure time) to stop motion.

For example, the exposure table in FIG. 2B is a sports mode fixed-length exposure table quantized to 0.5 stop (exposure value) increments. In this mode, the exposure time is kept as short as possible to stop motion, while aperture and gain are manipulated to increase light intensity and signal level. In FIG. 2B, there are 6 aperture settings (0–5, with 0=largest), and 13 gain settings (0–12, with 0=smallest). Note that because of the quantization, some gain settings do not appear.

Prior art fixed-length exposure tables are quantized using a particular light level quantization, such as logarithmic luminance quantizing steps, for example 0.5 stop (exposure value) as shown in FIG. 2B. As a result, the tables may be quantized in erratic ways, or may be excessively large, depending on the light level quantization chosen. Furthermore, upwards of twenty tables may be used to cover different operating modes and different focal lengths (for zoom cameras). Such problems can cause the deterioration of image quality in certain situations, as well as requiring relatively large memory to store the tables.

SUMMARY OF THE INVENTION

The present invention is directed to overcoming one or more of the problems set forth above by generating the exposure table in a novel manner, that is, by choosing table entries based on aperture and electronic gain switch points rather than increments of exposure value. This provides variable-length quantization increments, rather than fixed-length increments. Briefly summarized, according to one aspect of the present invention, a photographic camera includes a photosensitive image receiver for generating an image, an optical system for focusing incident light representative of the image upon the receiver, and an exposure level determination section responsive to the incident light for generating a measured exposure value. In particular, the camera includes an exposure table containing values that regulate at least one photographic attribute that controls the image. The table includes a sequence of table entries for exposure values and corresponding values of at least one of an optical aperture value and an electronic gain value that provide for each table entry a correct image exposure for the corresponding exposure value, wherein the sequence of table entries are selected such that increments between the exposure values represented in the table are variable in length, thereby providing a continuous series of said at least one of the optical aperture values and gain values represented in the table.

By using variable-length exposure tables rather than fixed-length tables, the technical advantage of the invention is realized, that is, the tables can be tailored to provide optimum image quality while minimizing the size of memory needed to store the tables.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 2A and 2B are examples of known, fixed-length exposure tables;

FIGS. 3A and 3B are illustrations of variable-length exposure tables according to the invention;

FIG. 5 is an example of another known fixed-length exposure table, this one for fill-flash; and FIG. 6 is the variable length analog to the fixed length table of FIG. 6.

DETAILED DESCRIPTION OF THE INVENTION

Figure 1B:
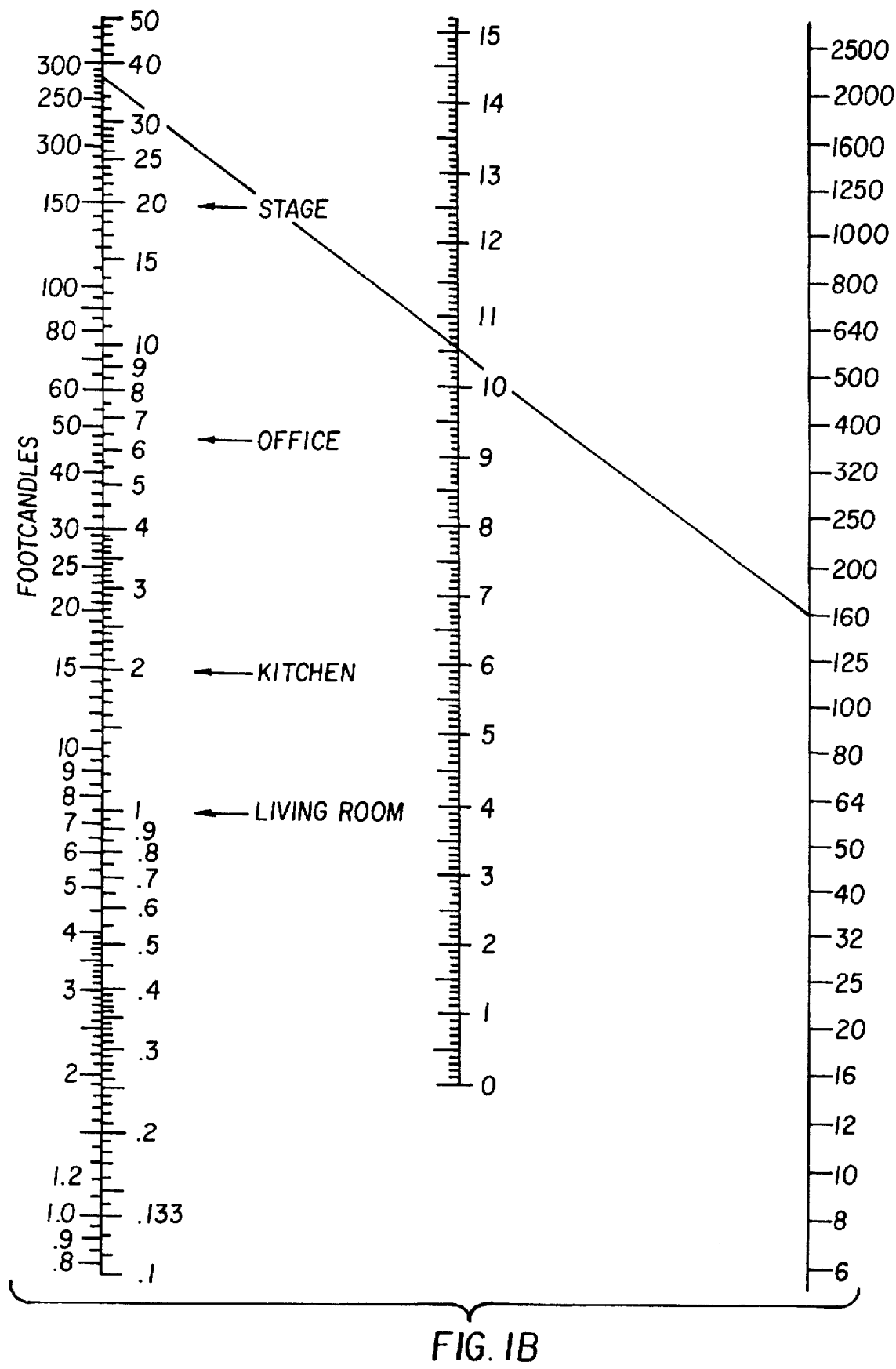
FIG. 1 shows FIGS. 1A and 1B which show a table for converting light level and receiver speed into an exposure value.

The invention is embodied in an exposure table of variable length, such as shown in FIGS. 3A and 3B, which contains all of the exact switch points, in terms of exposure values, at which the acquisition parameters for aperture and gain change. These tables are the variable length analogs to the fixed length tables in FIGS. 2A and 2B. Like the fixed length tables, the exposure time is not actually stored, but calculated at runtime. However, the exposure values are stored, although there may be fewer than in the number implied by the fixed-length tables. By basing the quantization increments on the switch points for the acquisition parameters, the number of entries may drop, but more importantly the table contains more accurate information for the exact switch points. This can be better understood by referring to an example, as follows. If the scene exposure value (light level) were to be evaluated at 9.8 EV, the fixed-length table (FIG. 2A) would yield due to quantization an aperture step of 2 and a gain step of 7, while the corresponding variable-length table (FIG. 3A) would yield an aperture step of 3 and a gain step of 7. The difference in this example is that the aperture could be set to a smaller value (as provided by the variable-length table), than provided by the fixed-length table. This is because the fixed-length table rounds down to the 9.5 entry settings, rather than down to the nearest switch-point values of 9.65, as is done in the variable-length table. Even if the routine rounded up to the 10.0 entry settings, an error would be introduced by the fact that the exposure time would have to increase to get the extra exposure at the aperture step of 4 suggested by rounding up in the fixed-length table. The fixed-length table does not even show an entry which uses the aperture step of 3, which means that the camera will not be smoothly using all of the available aperture settings, and instead will jump past possible aperture settings.

If the camera were to use the fixed-length table, the exposure time might in fact be manipulated to generate the correct exposure, but the exposure time could actually be forced to increase past the bounds for acceptable image blur. By storing exact switchpoints, the camera has more gain or aperture steps available, and can utilize them to better advantage in certain situations without, for example, having to increase the exposure time beyond acceptable bounds.

In exposure tables, aperture steps typically refer to incremental aperture diameters. As is shown in the exposure tables of FIGS. 2A, 2B, and 3A, 3B, by outputting the step value 0, the exposure control system will set the aperture to its largest diameter, while an output of 5 means the smallest available aperture diameter. These diameters determine the operating F# of the camera, by the following equation:

Effective F-number=Focal Length/(ApertureDiameter*Pupil Mag)

where
FocalLength=focal length of the lens in mm
ApertureDiameter=diameter of the aperture opening in mm
Pupil Mag=aperture diameter magnification going through camera lens Practice of the invention enables the use of all achievable apertures, or F-numbers, in a particular optical system.

Gain steps, in an electronic camera, refers to setting the analog gain between the image sensor and the digital conversion step. When set to higher values, the signal coming out of the image sensor is amplified, along with any noise. Although raising the gain allows the exposure time or aperture diameter to stay as small as possible, the amplification of the noise from the image sensor may result in grainy images, similar to using faster speed film. Practice of the invention, in this case, allows use of a continuous series, or range of gain factors. Other gain factors may be achievable, of course, but are not useful in the system (e.g., because of noise) and therefore are not in the table. Similarly, some apertures may be achievable but not useful, for example, because of optical aberrations. Practice of the invention, in this case, allows use of a continuous series, or range of useful aperture values.

Figures 4, 4A:
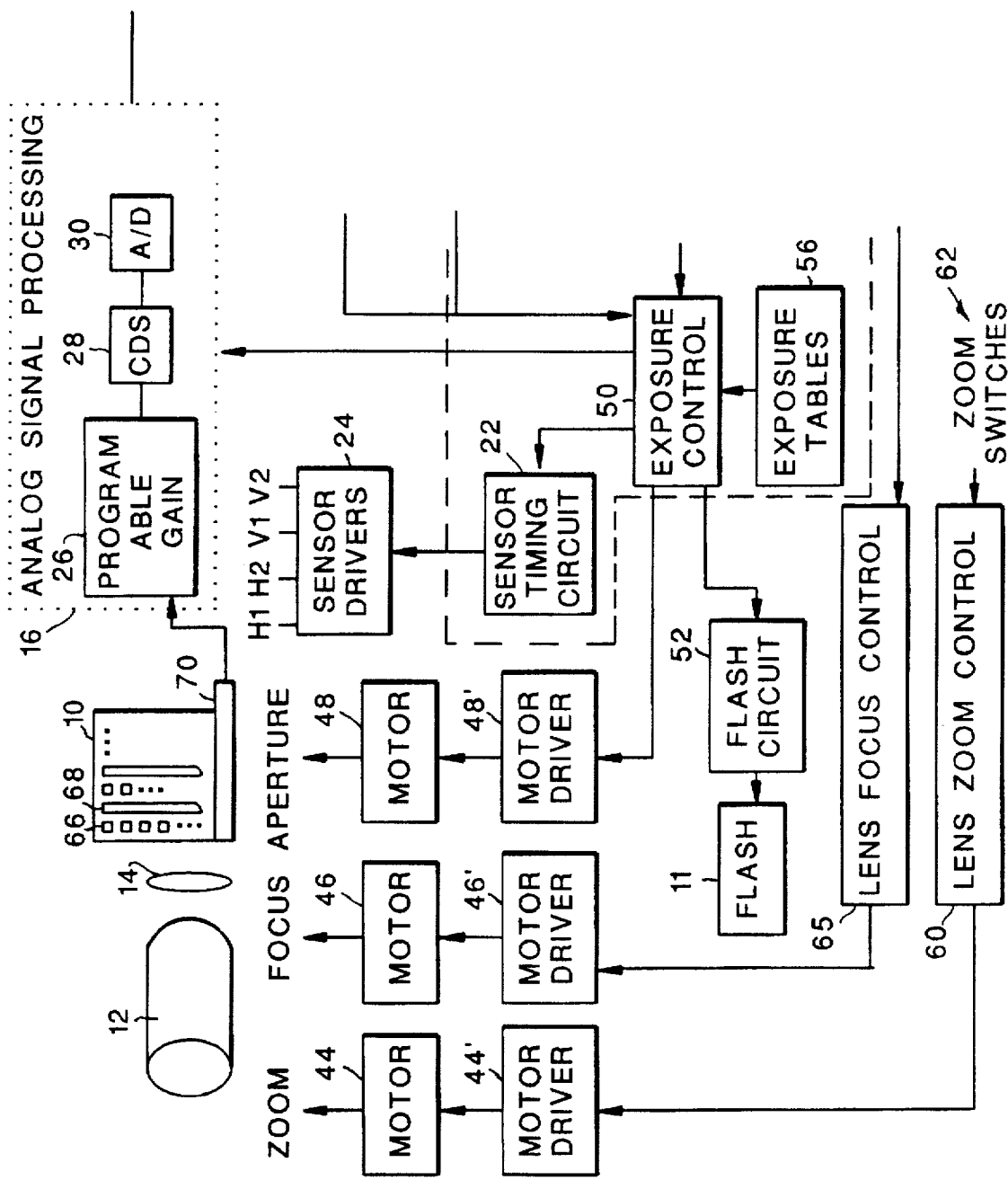
FIG. 4 shows FIGS. 4A and 4B which show a block diagram of an electronic camera incorporating a variable-length exposure table of the type shown in FIGS. 3A or 3B.
Figure 4B:
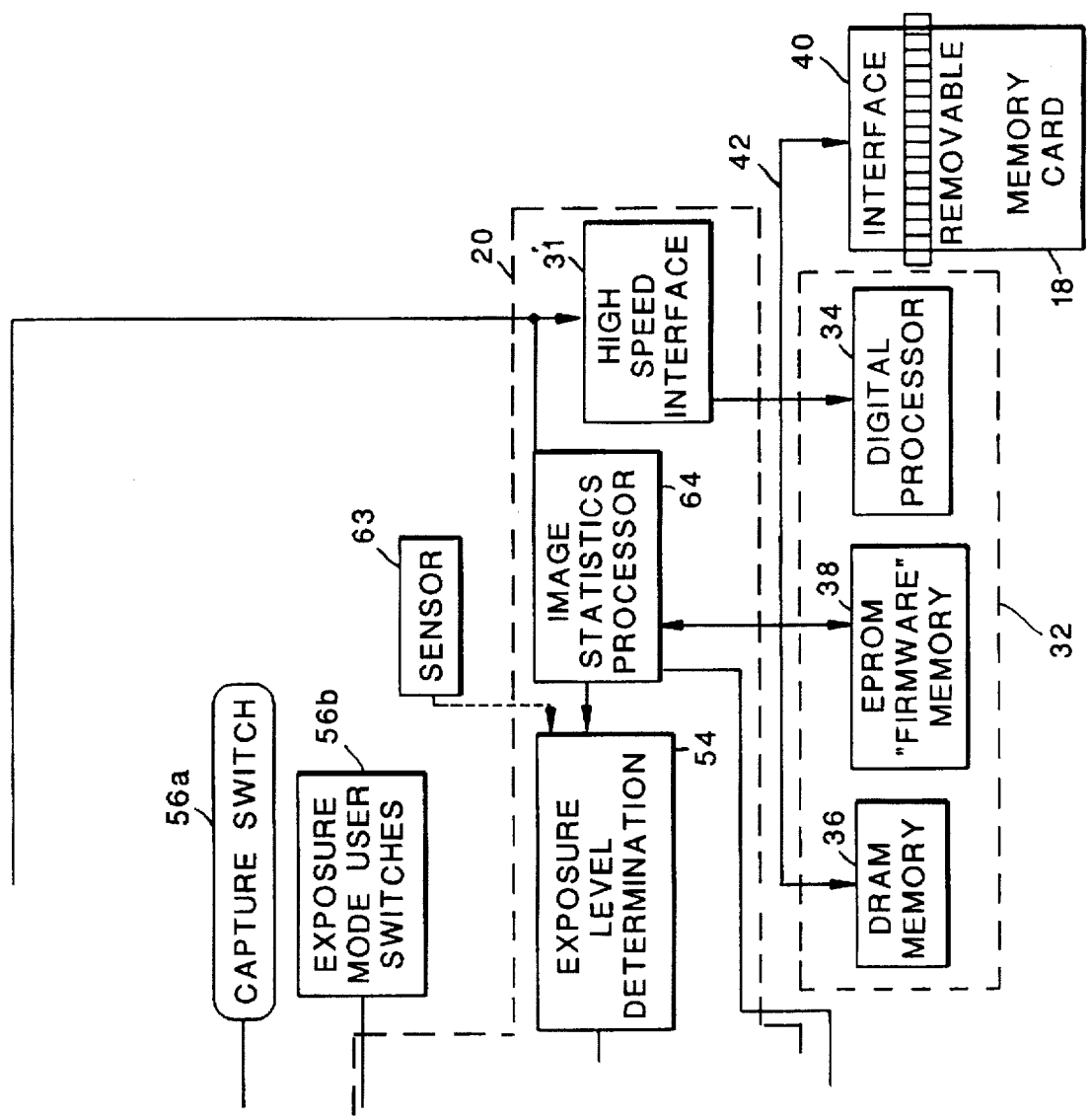

A block diagram of a photographic camera incorporating a variable length exposure table according to the invention is shown in FIG. 4. Incident light from an object (not shown) is focused upon a photosensitive image receiver by an optical system, in this case including a motor driven zoom lens 12 and a mechanical aperture 14. While the invention is applicable to a photographic film camera as well as to a photographic electronic camera, the camera shown in FIG. 4 is an electronic camera and the photosensitive image receiver is an electronic image sensor 10. The intensity of the image light upon the sensor 10, which may be influenced by a flash 11, is regulated by the motor-driven, mechanical aperture 14, while exposure time is regulated electronically by appropriate clocking of the sensor 10. (Alternatively, and particularly for a film camera, a mechanical shutter may be provided.) The still image from the image sensor 10 is processed in an analog processing section 16, converted to a digital signal, arid digitally stored on a removable memory card 18. Control of the sensor is provided by a timing and control section 20, which provides processing and timing functions for the camera. For instance, the timing and control section 20 includes a sensor timing circuit 22 for controlling the image sensor functions. The sensor timing circuit 22 provides the signals to enable sensor drivers 24, which provide horizontal clocks (H1, H2), and vertical clocks (V1, V2).

The output of the image sensor 10 is amplified and processed in an analog programmable gain setting circuit 26, then sampled in a correlated double sampling (CDS) circuit 28, and converted to digital form in A/D converter stage 30. The gain setting circuit 26 is responsive to an electronic gain value for establishing the gain of the signal output by the image sensor 10. The A/D output signal is provided through a high speed interface 31 to a processor section 32, which includes a digital processor 34, a DFAM memory 36 for temporarily storing the still images, and a firmware memory 38. The digital processor 32 performs image processing on the still images, and stores the processed images on the removable memory card 18 via a memory card interface circuit 40, which may use the PCMCIA 2.0 standard interface. The EPROM firmware memory 38 is used to store the firmware which operates the processor 34. The components of the processor section 34 are interconnected through a data bus 42, which also connects to the timing and control section 20 and to the card interface 40.

The motor-driven zoom lens 12 includes a zoom motor 44, a focus motor 46, and an aperture motor 48 (all controlled by respective motor drivers 44', 46', 48'). The timing and control section 20 further includes an exposure control interface 50, which is connected to the aperture motor driver 48', a flash control circuit 52( which controls the operation of the flash 11), the sensor timing circuit 22, and the programmable gain setting circuit 26. Exposure level is input to the exposure control interface 50 by an exposure level determination circuit 54, and the exposure tables are accessed from the exposure table memory 56. A capture switch 56a is used to trigger a capture sequence for taking and recording an image, and exposure mode user switches 56b are used to select an exposure mode, e.g., fill flash, sports, portrait, landscape, and so on. (Each exposure mode corresponds to a particular exposure table in the exposure table memory 56.) The lens zoom position is controlled by a zoom lens controller 60 based on position input from the zoom control switches 62 (providing, for instance, separate "zoom in" and "zoom out" buttons).

The focusing values and exposure values are computed automatically by an image statistics processor 64 in the timing and control section 20 as image data is read out of the image sensor 10. More specifically, the image statistics processor 64 computes focus values which are then used to adjust the focus motor 46' via a focus control interface 65.

The image statistics processor 64 also provides a light value reading determined from the image data originating from the image sensor 10. This light value reading, which corresponds to the footlamberts entry in FIG. 1, is then converted into an exposure value in the exposure level determination circuit 54. Alternatively, a dedicated exposure sensor 63 may input a light reading directly to the exposure level determination circuit 54 for conversion into an exposure value. This exposure value is then used to dereference a selected exposure table stored in the exposure table memory 56.

The sensor 10 is a progressive scan interline color image sensor having a noninterlaced architecture. It comprises a two-dimensional array of photosites 66, e.g. photodiodes, overlain by a color filter array and arranged in rows and columns of image pixels. A plurality of vertical registers 68 adjacent photosite columns are arranged to transfer rows of image pixel charge from the photosites 66 to a horizontal register 70 for readout responsive to clock signals from the sensor drivers 24. A preferred image sensor is the Kodak model CCD KAI-0400CM image sensor, which has approximately 512 active lines with approximately 768 active pixels per line and an image aspect ratio of 3:2. This sensor is described in a Performance Specification document available from Eastman Kodak Company, Rochester, N.Y. The sensor 20 uses a progressive scan readout method, which allows the entire image to be read out in a single scan.. The accumulated or integrated charge for the photodiodes comprising the pixels 66 is transported from the photosites to the light protected vertical (parallel) registers 68 by applying a large positive voltage to the phase-one vertical clock (V1). This reads out every row, or line, into the vertical registers 68. The image pixel charge is then transported from the vertical registers 68 to the horizontal register 70 by two-phase clocking of the vertical clocks (V1, V2). The horizontal register 70 delivers a stream of color pixel signals to the analog processing section 16. The color pixel signals are subsequently converted to digital pixel signals in the A/D converter 30.

In taking a still picture, the user turns on the camera (using a power switch (not shown), which may be automatically enabled when the user depresses the zoom switches 62, or partially depresses the capture button 56a). The user selects different exposure modes (e.g., a sports mode, a landscape mode, a portrait mode, etc.) by activating the appropriate exposure mode switch 56b. Depending upon the exposure mode switch 56b that has been activated, the selected exposure table 56 is accessed by the exposure control interface 50. Meanwhile, the exposure level determination circuit 54 receives a current light level measurement from either the external light metering unit 63 (as in a film camera) or from the image sensor 10 itself (as in an electronic camera). In the case of a film camera, the external light meter output directly describes the scene light level. In the case of a digital camera, the current acquisition parameters and the current image levels are used to calculate an effective scene light level. This light level is converted to exposure value and used by the exposure control interface 50 to reference the selected exposure table, which describes the acquisition parameter settings to be used to correctly expose the image receiver for this incident light level. As is shown in FIG. 4, the exposure control interface 50 applies the appropriate signals to modify the aperture diameter, the analog gain, and/or the exposure time to correctly capture an image. Exposure on the image receiver will increase if the exposure control interface 50 increases the aperture diameter or the exposure time. Exposure will decrease by decreasing the aperture diameter or the exposure time. In terms of the overall system, the aperture diameter, exposure time and gain are specified by the step increments used by the system, such as the stepper motor steps used by the motor 48 to set the aperture position. The exposure time steps control either a mechanical or electronic shutter for either electronic or film camera applications. One time unit, for example, represent the minimum exposure time possible, such as one scanning line time or approximately 50 microseconds. Typically, the time step would control a hardware counter mechanism which counts at the time step quantization. Thus 10 exposure steps would yield an exposure time of 10 times the hardware exposure time quantization, for example, 500 microseconds. Gain can be increased to increase the signal from the electronic image sensor 10 before it is quantized by the system A/D converter 30.

Meanwhile, as the aforementioned processing is taking place, the user composes the picture by depressing the "zoom in" or "zoom out" switches 64, and by adjusting the position of the camera, while observing the image through an interconnected viewfinder (not shown). When the user is satisfied with the composition, the user depresses the capture button 56a, which initiates the capture sequence. Finally, after all of the acquisition parameters have been set, the camera captures a single still image, firing the flash 11 if necessary when the ambient illumination level is low.

The invention has been described with reference to a preferred embodiment. However, it will be appreciated that variations and modifications can be effected by a person of ordinary skill in the art without departing from the scope of the invention. For example, FIG. 5 and 6 show examples of fixed length and variable length fill flash mode exposure tables, respectively. The flash is always turned on (flash charge-255) but turned off at variable times (according to the flash discharge columns). Besides illustrating additional acquisition parameters (flash charge and flash discharge), the variable length table (FIG. 6) shows a considerable saving of memory compared to the fixed length table (FIG. 5).

PARTS LIST 10 image sensor
11 flash
12 zoom lens
14 aperture
16 analog processing section
18 memory card
20 timing and control section
22 sensor timing circuit
24 sensor drivers
26 programmable gain setting circuit
28 correlated double sampling circuit
30 A/D converter
31 high speed interface
32 processor section
34 digital processor
36 DRAM memory
38 firmware memory
40 interface circuit
42 data bus
44 zoom motor
46 focus motor
48 aperture motor
44', 46', 48' respective motor drivers
50 exposure control interface
52 flash control circuit
54 exposure level determination circuit
56 exposure table memory
57 capture switch
58 exposure mode switches
60 zoom lens controller
62 zoom lens control switches
64 image statistics processor
65 focus control interface
66 photosites
68 vertical registers
70 horizontal register
72 charge drain

I claim:

1. A photographic camera including a photosensitive image receiver for generating an image, said camera comprising:

an optical system for focusing incident light representative of the image upon the receiver;

an exposure level determination section responsive to the incident light for generating a measured exposure value;

an exposure table containing values that regulate at least one photographic acquisition parameter that controls the image, said table including a sequence of table entries for exposure values and corresponding values of at least one of an optical aperture value and a receiver gain value that: provide for each table entry a correct image exposure for the corresponding exposure value, wherein the sequence of table entries are selected such that increments between the exposure values represented in the table are variable in length, thereby providing a continuous series of said at least one of the optical aperture values and gain values represented in the table; and an exposure control section for accessing a table entry based on the measured exposure value in order to regulate the photographic acquisition parameters of the image.

2. A photographic camera as claimed in claim 1 wherein the camera is a film camera, the photosensitive image receiver is film, and the table includes optical aperture values.

3. A photographic camera as claimed in claim 1 wherein the camera is an electronic camera, the photosensitive image receiver is an electronic sensor, and the table includes gain values.

4. A photographic camera as claimed in claim 3 wherein the exposure level determination section is responsive to an output of the photosensitive image receiver in order to generate a measured exposure value.

5. A photographic camera as claimed in claim 1 further including an exposure level sensor positioned on the camera to respond to incident light, and wherein the exposure level determination section is responsive to an output of the exposure level sensor in order to generate a measured exposure value.

6. A photographic camera including a photosensitive image receiver, an optical system for focusing incident light representative of an image upon the receiver, and an exposure control section for generating an exposure value from the incident light that is used to regulate the intensity or duration of the incident light upon the receiver, the improvement wherein the exposure control section includes an exposure table containing values that regulate the intensity or duration of the incident light, said table including a sequence of table entries for exposure values and corresponding values of lens apertures, wherein the sequence of table entries for exposure values are based upon quantization increments that are selected to be variable such that all occurrences of useful lens aperture values are represented in the table.

7. A photographic camera as claimed in claim 6 wherein the photosensitive image receiver is film.

8. A photographic camera as claimed in claim 6 wherein the photosensitive image receiver is an electronic sensor.

9. A photographic camera as claimed in claim 8 wherein the exposure value is obtained from signals output by the electronic sensor.

10. A photographic camera as claimed in claim 6 wherein the exposure value is obtained from a measurement of the incident light.

11. An electronic camera including a image sensing device, an optical system for focusing incident light representative of an image upon the image sensing device, and an exposure control section for generating an exposure value from the incident light that is used to regulate the intensity or duration of the incident light upon the image sensing device, the improvement wherein the exposure control section additionally uses the exposure value to regulate a gain factor applied to a signal output from the image sensing device; and the exposure control section includes an exposure table containing control values that regulate the gain factor and the intensity or duration of the incident light, said table including a sequence of table entries for exposure values and corresponding values of at least one of a lens aperture value and a gain value, wherein the sequence of table entries for exposure values are based upon variable quantization increments that are selected to provide a corresponding continuous sequence of useful lens aperture values and a continuous series of gain values.

12. An electronic camera as claimed in claim 11 wherein the exposure value is obtained from the image sensing device.

13. An electronic camera as claimed in claim 11 wherein the sequence of achievable lens aperture values in the table represents a usable range of the aperture values achievable by the optical system.

14. An electronic camera as claimed in claim 11 wherein the continuous series of gain values in the table represent a range of gain factors that are usable in modifying the output of the image sensing device.

15. A method for generating a quantized exposure table that regulates at least one acquisition parameter, including an aperture parameter, that controls the exposure quantity of an image generated by a photosensitive image receiver in a camera, the method comprising the steps of:

determining a sequence of switch points at which said at least one acquisition parameter, including the aperture parameter, switches from one discrete value to the next discrete value;

determining an exposure value for each switch point and an exposure value quantization increment corresponding to a transition in each acquisition parameter from one discrete value to the next discrete value such that a sequence including all discrete values, including aperture values, achievable within the sequence are represented in the exposure table; and storing each exposure value and its corresponding said at least one switch point as a table entry in the exposure table, whereby a sequence of exposure value table entries are generated that have variable quantization increments.

16. The method as claimed in claim 15 in which said at least one acquisition parameter includes an electronic gain value.

17. The method as claimed in claim 16 in which the table contains all gain values in a continuous series of gain values.

* * * * *